US009729422B2

(12) United States Patent
Hooda et al.

(10) Patent No.: US 9,729,422 B2
(45) Date of Patent: Aug. 8, 2017

(54) TRACE FEATURE ACROSS THE NETWORK (DEPTH AND BREADTH)-WISE

(71) Applicant: Cisco Technology, Inc., San Jose, CA (US)

(72) Inventors: Sanjay Kumar Hooda, Cupertino, CA (US); Venkatabalakrishnan Krishnamurthy, Cupertino, CA (US); Tushar J. Patel, Sunnyvale, CA (US); Ganesh Srinivasa Bhat, Union City, CA (US)

(73) Assignee: Cisco Technology, Inc., San Jose, CA (US)

( * ) Notice: Subject to any disclaimer, the term of this patent is extended or adjusted under 35 U.S.C. 154(b) by 95 days.

(21) Appl. No.: 14/656,840

(22) Filed: Mar. 13, 2015

(65) Prior Publication Data

US 2016/0269266 A1    Sep. 15, 2016

(51) Int. Cl.
*G01R 31/08* (2006.01)
*H04L 12/26* (2006.01)
*H04L 12/24* (2006.01)

(52) U.S. Cl.
CPC .......... *H04L 43/16* (2013.01); *H04L 41/0853* (2013.01); *H04L 43/04* (2013.01); *H04L 43/10* (2013.01)

(58) Field of Classification Search
CPC ....... H04L 43/16; H04L 43/04; H04L 4/0853; H04L 43/10
See application file for complete search history.

(56) References Cited

U.S. PATENT DOCUMENTS

| | | | | |
|---|---|---|---|---|
| 6,061,334 | A | * | 5/2000 | Berlovitch ............. H04L 12/46 370/255 |
| 6,697,338 | B1 | * | 2/2004 | Breitbart ................ H04L 41/12 370/254 |

(Continued)

FOREIGN PATENT DOCUMENTS

| | | | |
|---|---|---|---|
| EP | 2 234 344 | * | 9/2010 |
| EP | 2509261 A1 | | 10/2012 |

OTHER PUBLICATIONS

European Communication—Extended Search Report dated Jul. 22, 2016 cited in Application No. 16155741.8, 8 pgs.

(Continued)

*Primary Examiner* — Robert Wilson
(74) *Attorney, Agent, or Firm* — Merchant & Gould P.C.

(57) ABSTRACT

A feature trace capability may be provided for features including, but not limited to, automatic quality of service (auto QoS), power over Ethernet (PoE), and fabric compatibility. A network command may be implemented with the capability to validate features across a network path or the network as a whole. The output of this network command may result in the display of details about supported features. Such a command may also result in a listing of what devices require upgrades to support any number of features of interest. Embodiments of the feature trace capability may be configured such that the query gets terminated once a final subnet (or endpoint) is reached. Alternatively, the feature trace capability may be configured such that the query gets terminated after a maximum hop count, or trace total (trace_ttl) is reached. Such a limit may prevent the continuous flooding of the network.

30 Claims, 5 Drawing Sheets

(56) References Cited

U.S. PATENT DOCUMENTS

| | | | | |
|---|---|---|---|---|
| 7,496,044 | B1* | 2/2009 | Wing | H04L 29/06027 370/242 |
| 7,596,097 | B1* | 9/2009 | McCowan | H04L 12/2602 370/248 |
| 8,289,845 | B1* | 10/2012 | Baldonado | H04L 43/16 370/229 |
| 2002/0161755 | A1* | 10/2002 | Moriarty | H04L 63/0236 |
| 2003/0217155 | A1* | 11/2003 | Greck | H04L 12/2697 709/227 |
| 2004/0218542 | A1* | 11/2004 | Lee | H04L 12/24 370/248 |
| 2006/0077989 | A1* | 4/2006 | Lu | H04L 29/06027 370/401 |
| 2007/0038433 | A1* | 2/2007 | Swoboda | G06F 11/3656 703/23 |
| 2008/0022336 | A1* | 1/2008 | Howcroft | H04L 12/2697 725/100 |
| 2008/0109545 | A1 | 5/2008 | Shah | |
| 2008/0253299 | A1* | 10/2008 | Damm | H04L 12/2697 370/252 |
| 2012/0051231 | A1* | 3/2012 | Ou | H04L 12/18 370/248 |
| 2014/0105038 | A1* | 4/2014 | Yu | H04L 43/065 370/252 |
| 2014/0369177 | A1* | 12/2014 | Keesara | H04L 43/0811 370/216 |
| 2015/0244617 | A1* | 8/2015 | Nakil | H04L 43/04 709/224 |

OTHER PUBLICATIONS

Cisco Systems et al., "Understanding the Ping and Traceroute Commands," Jan. 1, 2010, 22 pgs., XP055052448, retrieved from the internet: URL:http://www.cisco.com/image/gif/paws/12778/ping_traceroute.pdf [retrieved on Feb. 5, 2013].

* cited by examiner

TRACE FEATURE ACROSS THE NETWORK (DEPTH AND BREADTH)-WISE

TECHNICAL FIELD

The present disclosure relates generally to feature tracing across a network or a portion of a network, specifically, feature tracing may be employed to get feature capabilities along a single network path, or in all directions (subject to a hop count limit).

BACKGROUND

Prior approaches to debugging and feature tracing are still reliant on tools such as "ping" and "trace route." While such tools have proved useful in the past, the increasing complexity and intelligence of networks demands new tools to meet the demands of newly developed network features and capabilities. For example, prior to determining whether to employ automatic quality of service (auto QoS) functionality, it may be needed to verify the capabilities (features) of each device on the whole network or on the relevant portion of the network.

Some prior approaches employ "show version" software commands and subsequently map the results of the command back to a version where such feature support was implemented. These approaches are cumbersome and extremely time consuming.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Methods and system are disclosed which can introduce a feature trace capability for features including, but not limited to, auto QoS, power over Ethernet (PoE), and fabric compatibility. Furthermore, embodiments of the feature trace capability may be used to monitor network health. A network command may be implemented with the capability to validate features across a network path or the network as a whole. The output of this network command may result in the display of details about supported features. Such a command may also result in a listing of what devices require upgrades to support any number of features of interest. Embodiments of the feature trace capability may be configured such that the query gets terminated once a final subnet (or endpoint) is reached. Alternatively, the feature trace capability may be configured such that the query gets terminated after a maximum hop count, referred to here as a trace total (trace_ttl), is reached. Such a limit may prevent the continuous flooding of the network.

Feature tracing may be employed to request information about features across any network. The requests may be responded to by network devices on the network, where the responses provide information about the capabilities that the combination of the network device and the network may support. Network administrators may be able to query a whole network or part of a network through a network management station to run embodiments of the feature trace. In some cases, the network administrator may use feature tracing to determine which network devices require upgrading.

Both the foregoing overview and the following example embodiment are examples and explanatory only, and should not be considered to restrict the disclosure's scope, as described and claimed. Further, features and/or variations may be provided in addition to those set forth herein. For example, embodiments of the disclosure may be directed to various feature combinations and sub-combinations described in the example embodiment.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Figure 1:
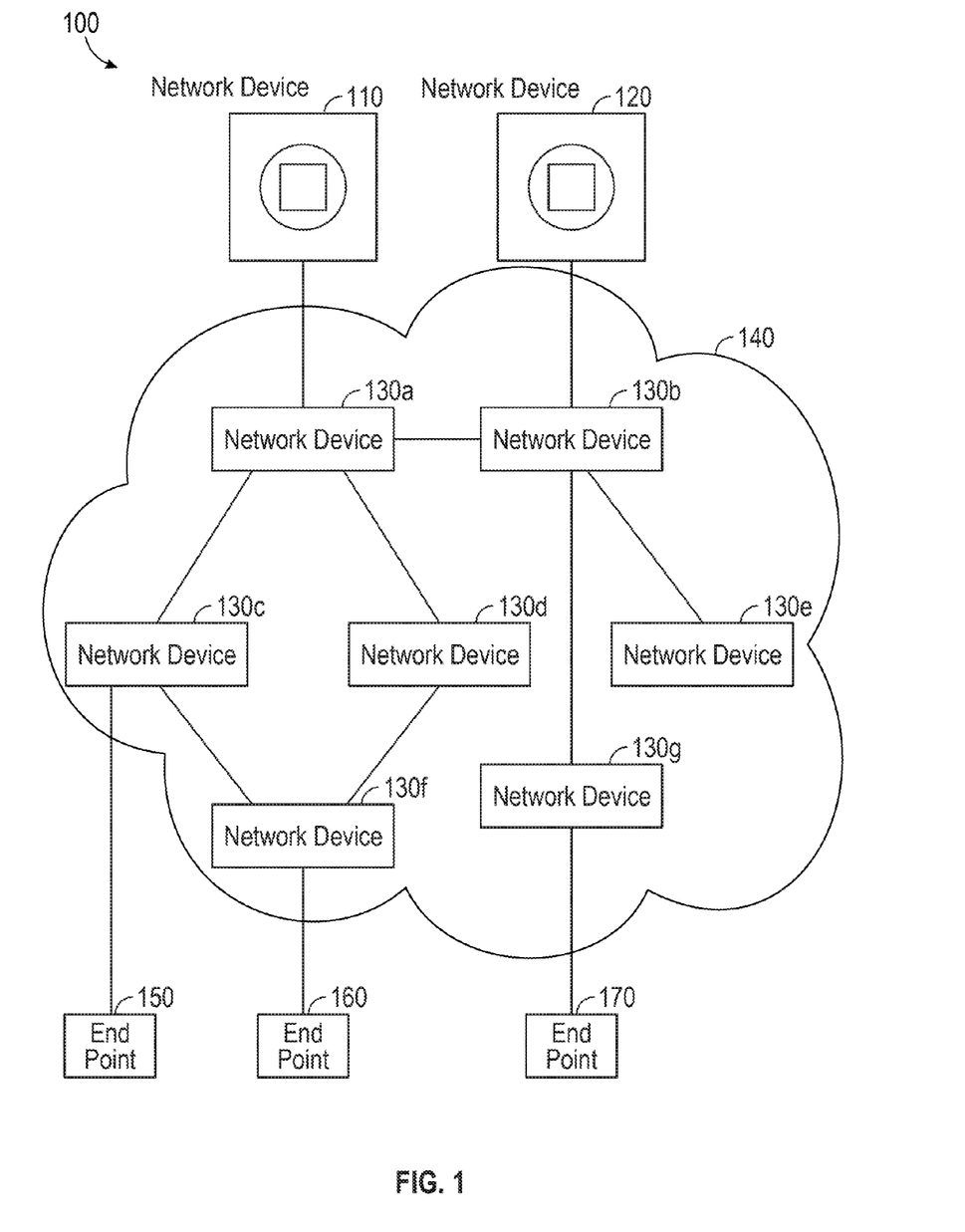
FIG. 1 illustrates a sample network topology where embodiments of the present disclosure may be performed.

FIG. 1 illustrates a sample network topology that will be used in the following description to illustrate embodiments of the present disclosure. The described network topology may exist in a networking environment 100. While networking environment 100 is depicted as a wired network environment, a wireless network environment is also consistent with embodiments of the disclosure. For example, networking environment 100 may be any type of system that transmits data packets over a network. As an example, networking environment 100 may be an environment enabled to provide voice communications, and video and data services.

Networking environment 100 may be based on a bi-directional transfer of packet based service, such as Internet Protocol (IP) traffic, between any number of network devices. Networking environment 100 may further include a plurality of gateways (not shown), for example, but not limited to cable modems, routers, switches, set top boxes, and computers. Networking environment 100 may include any combination of wide area networks (WANs), local area networks (LANs), or wireless networks suitable for packet-type communications, such as Internet communications.

Networking environment 100 may be designed to comprise a number of network devices, such as network device 110 and network device 120 that are capable of initiating a feature trace query. Throughout this disclosure, network device 110 and network device 120 may be referred to as network management stations. A trace feature query may be injected from a network management station to any connected network device across the network.

In some embodiments, feature trace queries may be injected over a Hypertext Transfer Protocol Secure (HTTPS) protocol connection for increased security. Once a targeted network device receives the feature trace query, the targeted network device may 1) respond to the query and 2) propagate the query to other network devices on a hop-by-hop basis. In some embodiments of the present disclosure, the feature trace query can start at the network management station itself.

For example, network device 110 may initiate a feature trace query that covers any or each of network devices 130a, 130b, 130c, 130d, 130e, 130f, and 130g. In some embodiments, network devices 130a, 130b, 130c, 130d, 130e, 130f, and 130g may reside on a network such as fabric network 140. As the feature trace traverses the network devices in fabric network 140, each network device may individually respond to the feature trace query and propagate the feature trace query.

Throughout the present disclosure devices such as network devices 130a, 130b, 130c, 130d, 130e, 130f, and 130g may be referred to as feature trace members. Feature trace members may include all network devices that are taking part in the present feature trace. A feature trace member may have the responsibility to reply to received feature trace queries. A feature trace member may have the further responsibility to propagate the received feature trace queries while keeping the original query source address information intact. A feature trace member may decrement a trace_ttl field in the feature request packet upon receipt. In some embodiments, the network device handing a feature trace query may be a Layer 2 switching device and may keep the trace_ttl field in the feature request packet the same and not replicate the feature request packet. As discussed in further detail below, the destination MAC address in the feature request packet may handle replication in a Layer 2 environment.

In some embodiments of the present disclosure, the endpoints of the feature trace query may provide responses to the feature trace query when an agent is running on the endpoint. For example, in networking environment 100 the endpoints may include endpoint 150, endpoint 160 and endpoint 170. In some embodiments, endpoint 170 may be an IP-enabled telephone.

Endpoints may be viewed at as the network devices which are connected to the edge of the network domain. In some embodiments, an endpoint device may not be capable of responding to feature trace queries and instead may drop such queries. Network devices generally are discussed in further detail in regards to FIG. 4.

In embodiments of the present disclosure, feature trace queries may be responsible for extracting information about the feature from the network devices. This may be accomplished by having the feature trace queries traverse the desired network path in a hop-by-hop manner. Protocols used consistent with present embodiments of feature tracing may include Internet Control Message Protocol (ICMP), User Datagram Protocol (UDP) among others. Regardless of the desired outer protocol, the request, response, and feature information extraction functions in described embodiments of the feature trace may work in a similar fashion.

Figure 2:
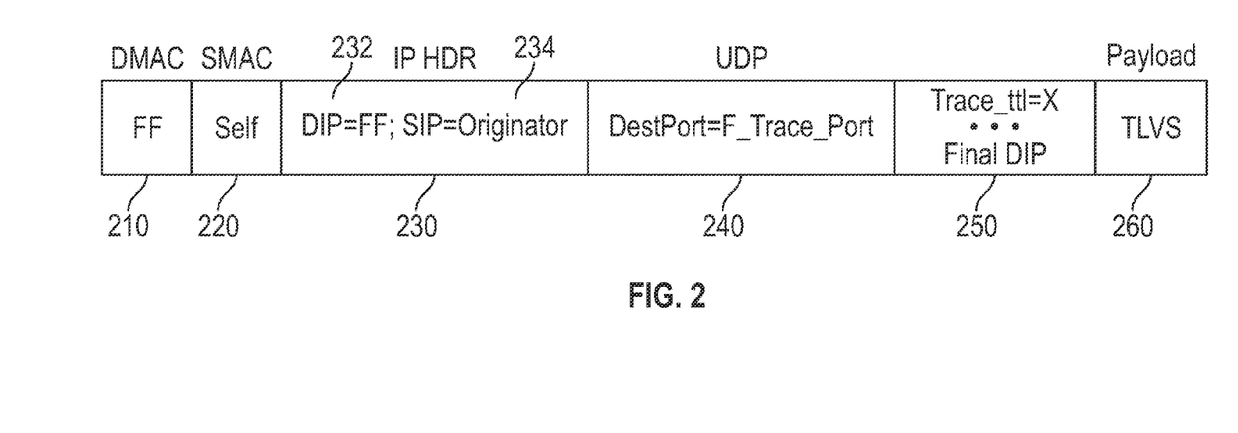
FIG. 2 illustrates a sample feature trace query packet used in embodiments of the present disclosure.

FIG. 2 illustrates embodiments of a feature trace query packet 200 used in the request of feature trace information. Feature trace query packet 200 may have a Destination MAC (DMAC) field 210. DMAC field 210 may contain destination address information for trace query packet 200. In some embodiments, DMAC field 210 may always be set to a value of "FF" to ensure that trace query packet 200 reaches all desired network devices connected to the traceable network segment.

DMAC field 210 may be followed by a Source MAC (SMAC) field 220. SMAC field 220 may contain source address information for a network device responsible for sending trace query packet 200. In some embodiments, packets may be replicated by one or more intermediate nodes. In such embodiments, SMAC field 220 may contain a MAC address of the intermediate node (such as INT_NODE_MAC).

SMAC field 220 may be followed by an IP header field 230. IP header field 230 may contain both a destination IP field 232 and a source IP address field 234. In some embodiments, destination IP field 232 may be set to a value of "FF" to ensure that trace query packet 200 reaches all desired network devices connected to the traceable network segment. In other embodiments, destination IP field 232 may be set to a directed feature discovery address. There, destination IP field 232 may be set to the IP address of a particular network device where a feature may be expected to reside.

In some embodiments of the present disclosure, source IP field 234 may always be set to an IP address corresponding to the originator of the feature trace query. Source IP field 234 should not be set to the address of any replicator of the feature trace query packet 200. This may ensure that the source address of the query is maintained throughout the trace.

IP header field 230 may be followed by an UDP port field 240. UDP port field 240 may contain address information for a destination UDP port. In the example, UDP port field is set equal to "F_TRACE_PORT". Such a value may ensure that each feature trace query packet 200 is punted to software for processing. Such processing may allow the feature details to be extracted.

UDP port field 240 may be followed by a trace header field 250. Trace header field 250 may track the trace_ttl value. The trace_ttl value may be initially set to a maximum number of hops that trace query packet 200 should travel through during the feature trace. Upon reaching each network device on the desired trace path, the trace_ttl value may be decremented by 1, before feature trace query packet 200 is replicated and forwarded. In some embodiments, when the trace_ttl value is equal to 0, feature trace query packet 200 will no longer be replicated or forwarded further down the network path.

Feature trace queries employing the trace_ttl value may be referred to herein as "general queries" or "queries with a hop count". Such queries may not specify any destination address, but rather a maximum number of hops to extend the query. The maximum number of hops may be represented by the trace_ttl value. General queries may travel in any/all directions until the trace_ttl value equals 0.

In some embodiments of the present disclosure, trace header field 250 may contain address information relevant to directed feature discovery. For example, trace header field 250 may contain a "FinalDIP" value which represents the final IP destination address for a trace feature query directed to an endpoint. It should be understood that even on a directed feature discovery, feature responses may be received from intermediate network devices between the source of the query and the desired endpoint. Such directed feature discovery also may have the capability to initially reveal the used network path between the source of the query and the desired endpoint.

Trace header field 250 may be followed by a payload field 260. Payload field 260 may contain feature specific information. In some embodiments, such feature specific information may be in a type-length variable (TLV) format. This formatting may allow backwards compatibility for embodiments of the feature trace query. In some embodiments, the TLV information may comprise a feature identification value that is commonly known across the network. While the packet construction is illustrated in a particular order in FIG. 2, it is contemplated that the information contained in feature trace query packet 200 may be in any suitable order or combination.

Figure 3:
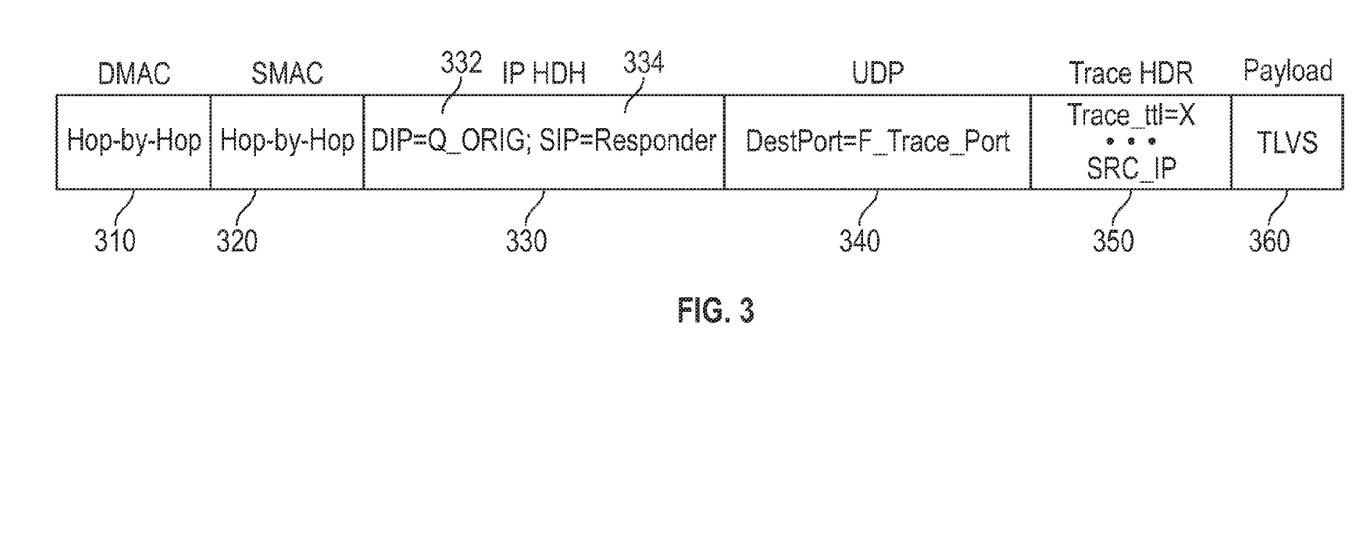
FIG. 3 illustrates a sample feature trace response packet used in embodiments of the present disclosure.

FIG. 3 illustrates embodiments of a feature trace response packet 300 used in returning the feature information requested by the originator of the feature trace query. Feature trace response packet 300 may have a Destination MAC (DMAC) field 310 and a Source MAC (SMAC) field 320. These fields are similar to the corresponding field in trace query packet 200. The source and destination address information may be determined on a hop-by-hop basis. In some embodiments of the present disclosure, feature trace response packet 300 is a UDP unicast packet.

Feature trace response packet 300 may further have an IP header field 330. IP header field 330 may contain both a destination IP field 332 and a source IP address field 334. In some embodiments, destination IP field 332 may be set to a value of "Q_ORIG" to ensure that trace response packet 300 reaches the network device that originated the trace feature request. Similarly, in some embodiments, source IP field 334 may be set to an IP address corresponding with the network device responding to the trace feature request.

Feature trace response packet 300 may further have an UDP port field 340. UDP port field 340 may contain address information for the destination UDP port. In the example, UDP port field is set equal to "F_TRACE_PORT". Similar to feature trace query packet 200, this value may ensure that each feature trace response packet 300 is punted to software for processing. Such processing may allow the feature details to be transmitted.

Feature trace response packet 300 may further have a Trace header field 350 which may track the current trace_ttl value at the time of generation of feature trace response packet 300. The trace_ttl value may be initially set to a maximum number of hops that trace query packet 200 should travel through during the feature trace. Upon reaching each network device on the desired trace path, the trace_ttl value may be decremented by 1, before feature trace query packet 200 is replicated and forwarded. In some embodiments, when the trace_ttl value is equal to 0, feature trace query packet 200 will no longer be replicated or forwarded further down the network path. In some embodiments of the present disclosure, trace header field 350 may contain address information of the source device that initiated the feature trace request.

Trace header field 350 may be followed by a payload field 360. Payload field 360 may contain feature specific information. In some embodiments, such feature specific information may be in a type-length variable (TLV) format. This formatting may allow backwards compatibility for embodiments of the feature trace query. While the packet construction is illustrated in a particular order in FIG. 3, it is contemplated that the information contained in feature trace response packet 300 may be in any suitable order or combination.

Using embodiments of feature trace query packets and feature trace response packets from above certain use cases may assist in illustrating embodiments of the present disclosure. For example, in a first use case, an administrator may wish to know whether all of the network devices in a given network (such as networking environment 100) support auto QoS functionality. A trace query packet may be generated with the DMAC field and the Destination IP field set to a value="FF". Next, the trace header field may set trace_ttl value=3. In the payload, a TLV value may be set to "auto_qos" to indication that the query is seeking auto QoS feature specific information.

For the second use case, it may be assumed that all aggregation links to access switches in the network are Layer-2 links. Once the trace query packet is injected into the network it will die out after trace_ttl value is decremented to 0. As such, all network devices that are no more than 3 hops away from the source will receive the trace query packet.

Looking at a second use case, an administrator may wish to determine whether network devices from a datacenter aggregation switch support auto QoS. An aggregation layer may make up the Layer-3 and Layer-2 boundary for a datacenter infrastructure. The aggregation switch may consolidate Layer-2 traffic in a high-speed packet switching fabric and provide a platform for network-based services at the interface between Layer-2 and Layer-3 in the data center. For the purposes of this use case, a WAN subnet may be identified as 192.168.1.0/24.

A trace query packet may be generated with the Destination IP field set to a value="192.168.1.0". Next, the trace header field may set to a maximum value. Such a maximum setting may be useful when an administrator is unsure of the number of hops necessary. In the payload, a TLV value may be set to "auto_qos" to indication that the query is seeking auto QoS feature specific information.

An aggregation switch may determine three routes travelling to the most significant prefix 192.168.1.0/24. Accordingly, the aggregation switch may prepare and inject three separate feature trace query packets. As each of the feature trace query packets reaches peer network devices, the peer network device will reduce the trace_ttl value by 1. Subsequently, the peer network devices inject the packets forward through the network path. When a trace query packet reaches a WAN access router, it may be determined that the address 192.168.1.0/24 is directly connected to the WAN access router. As such, the trace query packet does not need additional forwarding.

At the completion of this process for the three trace packets, all of the network devices found on a datacenter aggregation address list will have provided responses resulting in the accumulation of feature information for the datacenter aggregation switch. This approach may provide a way to map the logical topology of the datacenter aggregation switch.

A third use case focuses on ICMP implementations of embodiments in the present disclosure. Here, the feature trace approach may be viewed at as two separate parts. First, a feature solicitation process may occur. A singleton broadcast request may be generated from the network device initiating the query. Remote network devices may respond with small single packet responses. Second, a feature request message may be sent to one or more network devices. Feature request messages may be unicast message based on the responses received during the solicitation process.

The feature solicitation message may comprise a message ID tag to uniquely identify the request. Furthermore, the feature solicitation message may comprise a field to store the maximum number of hops for the feature trace (similar to trace_ttl). Next, a field may contain information pertaining to the maximum sends of the feature solicitation per hop. This value may correspond with the maximum number of solicitation requests should be sent by any given network device. The feature solicitation message may further comprise information identifying the feature for which the solicitation is pertaining. In some embodiments, feature solicitation message may further comprise secure network signatures.

Responses to feature solicitation message may comprise a message ID tag that corresponds to the message ID used to uniquely identify the request. Furthermore, the feature solicitation response message may comprise a field to store the maximum number of unsent ports. Next, a field may contain information pertaining to the maximum number of skipped first hop network device. This value may be followed by a feature status value and feature information in a TLV format. For example, the feature data may provide information comprising MAC addresses, IP addresses, product types, product numbers, operating system versions, and firmware versions. In some embodiments, the response are sent point-to-point from the responding network device to the querying network device.

ICMP feature requests may be sent point-to-point to a source IP address identified by the feature solicitation process. Feature requests may comprise a message ID tag to uniquely identify the feature request. Furthermore, the feature request may comprise information identifying the feature for which the feature request is pertaining. In some embodiments, feature requests may further comprise secure network signatures.

ICMP feature request responses may be sent point-to-point to the requestor. However, in ICMPv6 this assumes no Network Address Translation (NAT) traversal. In ICMPv4 embodiments, the sending may include NAT traversal in a stateful NAL. Feature request responses may comprise a sequence number. This value may be followed by feature data in a TLV format. For example, the feature data may provide information comprising MAC addresses, IP addresses, product types, product numbers, operating system versions, and firmware versions. In some embodiments, feature request responses may further comprise secure network signatures.

Figure 4:
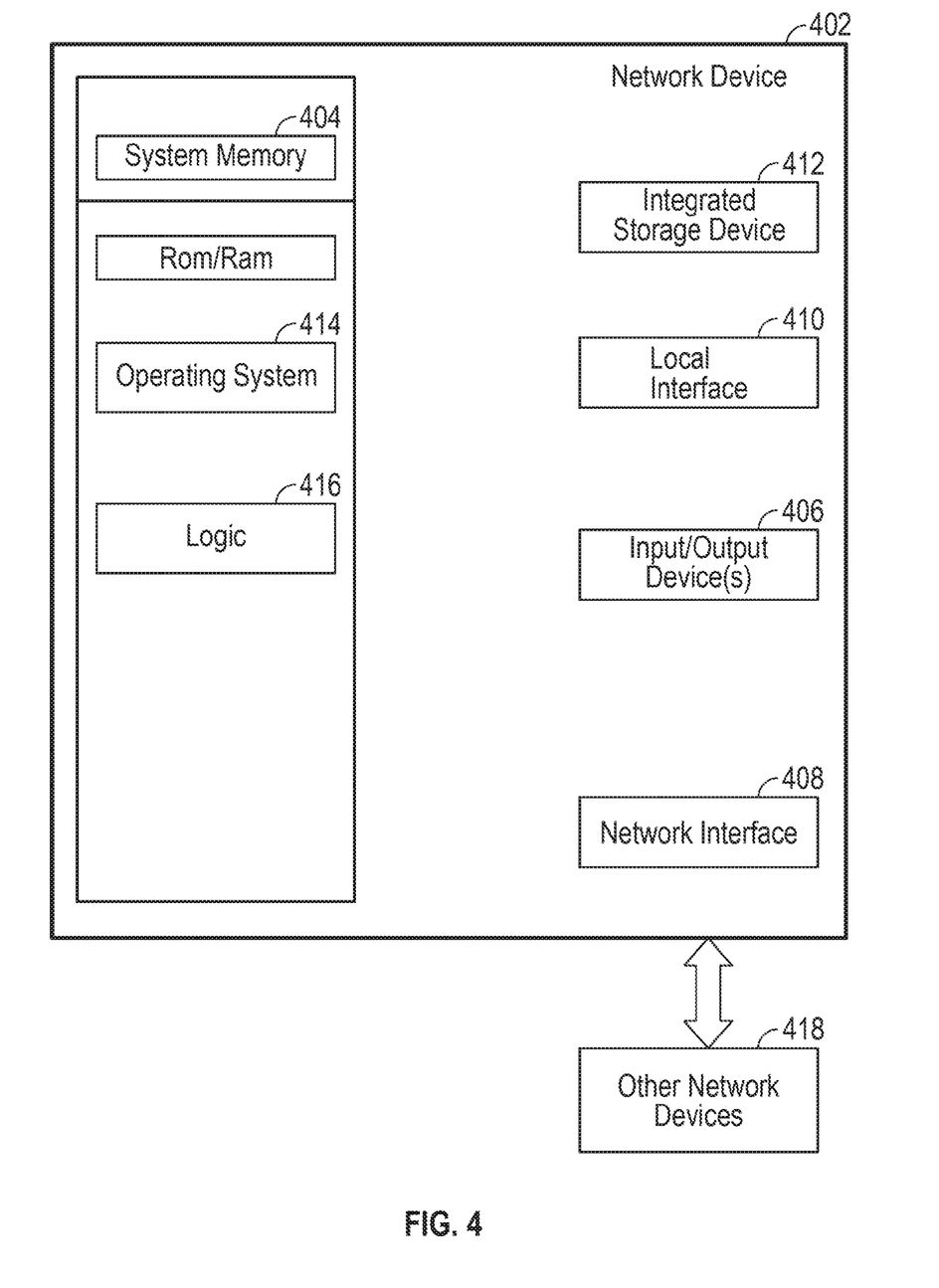
FIG. 4 shows a network device in greater detail.

FIG. 4 shows a network device (such as network devices 130a) in greater detail. A network device may include a processing device 402, a memory 404, input/output (I/O) devices 406, and a network interface 408, each of which may be communicatively coupled via a local interface (not shown). Processing device 402 may be a hardware device for executing software, particularly that which is stored in memory 404. Processing device 402 may be any custom made or commercially available processor, a central processing unit (CPU), an auxiliary processor among several processors, a semiconductor-based microprocessor (in the form of a microchip or chip set), a microprocessor, or generally any device for executing software instructions. Software executed by processing device 402 may include software at least capable of operating feature trace embodiments of the present disclosure.

Network interface 408 may include one or more devices that communicate both inputs and outputs, for instance but not limited to, a modulator/demodulator (modem for accessing another device, system, or network), a radio frequency (RF) transceiver or other type of transceiver, a telephonic interface, a bridge, a router, etc.

I/O devices 406 may include input devices, for example but not limited to, a keyboard, mouse, scanner, microphone, etc. Furthermore, the I/O devices 406 may also include output devices, for example but not limited to, a printer, display, etc.

The local interface may be, for example but not limited to, one or more buses or other wired or wireless connections. The local interface may have additional elements, which are omitted for simplicity, such as controllers, buffers (caches), drivers, repeaters, and receivers, to enable communications. Further, local interface 410 may include address, control, and/or data connections to enable appropriate communications among the aforementioned components and provides the interface to communicate with network management station, a feature trace member, an endpoint, a datacenter aggregation server, or any number of other network devices in networking environment 100.

In some embodiments, a network device may further be configured with an integrated storage device 412 coupled to local interface 410. Storage device 412 may be configured to buffer a plurality of data packets. One or more such buffers may be dedicated buffers for storing captured packets. In some embodiments, storage device 412 may be externally coupled to a content server (not shown).

Memory 404 may include a suitable operating system (O/S) 414. Operating system 414 essentially may control the execution of other computer programs, such as scheduling, input-output control, file and data management, memory management, and communication control and related services. Logic 416 may include executable code to send service requests to network management station, a feature trace member, an endpoint, a datacenter aggregation server, or any number of other network devices in networking environment 100.

Memory 404 may include any one or combination of volatile memory elements (e.g., random access memory (RAM, such as DRAM, SRAM, SDRAM, etc.)) and non-volatile memory elements (e.g., ROM, hard drive, tape, CDROM, etc.). Moreover, the memory 404 may incorporate electronic, magnetic, optical, semi-conductive, and/or other types of storage media. Note that memory 404 may have a distributed architecture, where various components are situated remotely from one another, which can be accessed by the processing device 402.

The software in memory 404 may include one or more separate programs, each of which comprises an ordered listing of executable instructions for implementing logical functions. In the embodiment shown in FIG. 4, the software in memory 404 may include operating system 414 and logic 416, as explained above. Functionality of logic 416 may be implemented using a single module, or distributed among a plurality of modules.

When logic 416 is in operation, processing device 402 may be configured to execute logic 416 stored within memory 404, to communicate data to and from memory 404, and to generally control operations of logic 416. Logic 416 and O/S 414, in whole or in part, but typically the latter, are read by processing device 402, perhaps buffered within processing device 402, and then executed.

The network controller may include a communication interface suitable for enabling communication (e.g., TCP/IP) of data packets with other network devices 418 of network environment 100. For instance, communication interface may be of a type suitable for communication over an IP network, a coaxial cable network, an HFC network, and/or wireless network, among others.

Figure 5:
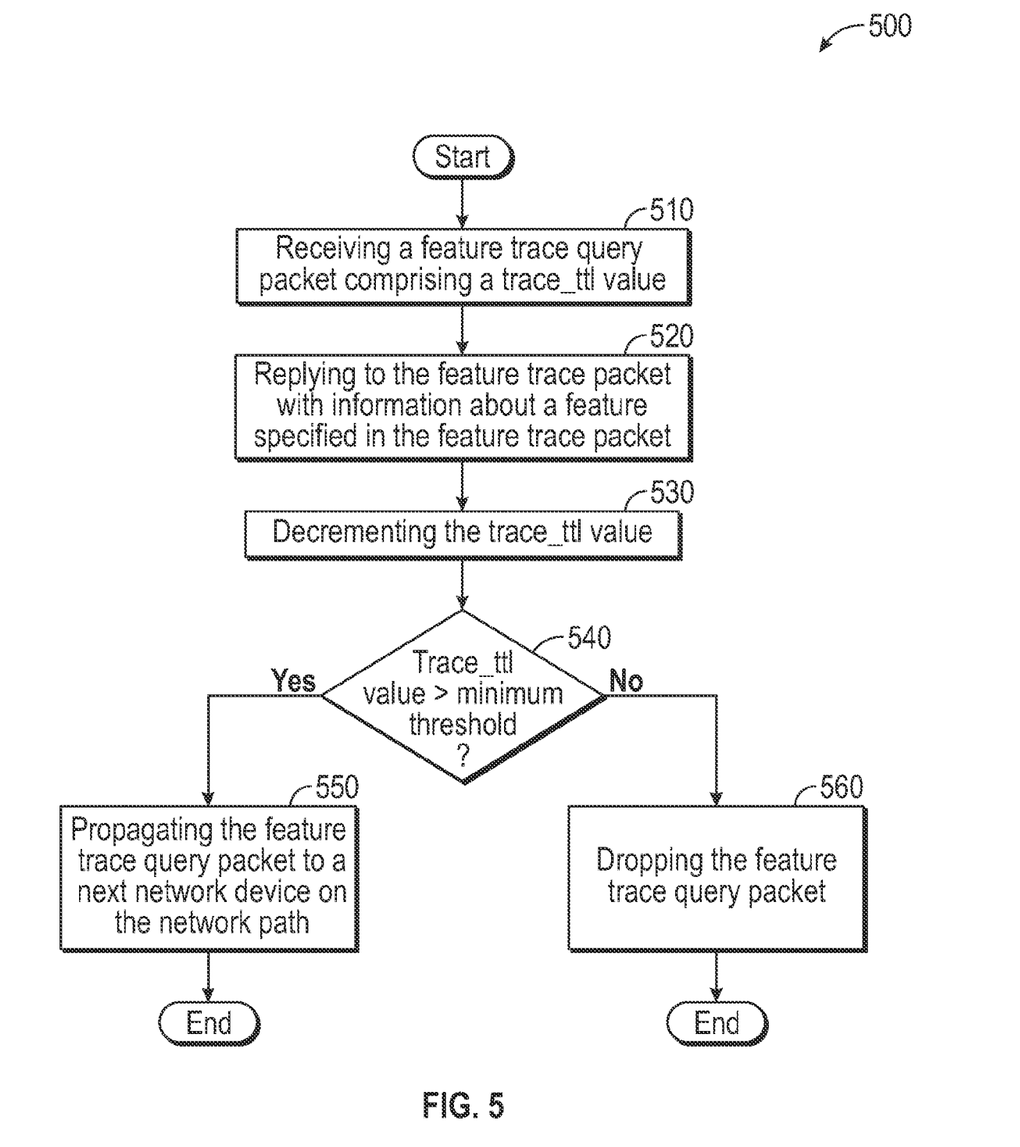
FIG. 5 is a flow chart illustrating embodiments of the present disclosure.

Having described various components of certain embodiments of network environment 100, a method 500 implemented by one or more network devices employed on network environment 100 will now be described with reference to FIG. 5. Method 500 may begin at step 510 where a feature trace query packet comprising a trace_ttl value may be received by a network device, such as a feature trace member. In some embodiments, the feature trace packet may be implemented using Internet Control Message Protocol (ICMP).

In some embodiments, the feature trace packet may comprise one or more destination address fields set to "FF". Furthermore, in some embodiments, the feature trace packet may comprise a source IP address field set to a source IP address associated with an originator of the feature trace packet. The feature trace packet may further comprise a destination User Datagram Protocol (UDP) port field set to a value that ensures that the feature trace packet is punted to software for processing. Furthermore, the feature trace packet may comprise a source MAC address field set to a source MAC address associated with a most recent propagator of the feature trace packet.

Method 500 may then proceed to step 520. At step 520, the feature trace query packet may be replied to with information about a feature specified in the feature trace packet. In some embodiments, the feature trace packet may comprise a payload field set to an identifier of the feature specified in the feature trace packet. The identifier may be provided in a type-length variable (TLV) format. In some embodiments, the feature may comprise one or more of auto QoS, PoE, and fabric compatibility.

In some embodiments of the present disclosure, replying to the feature trace query packet may comprise transmitting a feature trace response packet with a destination address field set to an IP address associated with an originator of the feature trace packet. The feature trace response packet may provide information responsive to the identifier of the feature specified in the feature trace packet.

Next, method 500 may proceed to step 530 where the trace_ttl value may be decremented. While embodiments herein describe the trace_ttl value being decremented by 1, the disclosure contemplates embodiments where different values and amounts maybe used to accurately represent the allowed maximum number of hops for a feature trace query.

Subsequently, at step 540, it may be determined whether or not the trace_ttl value is above a minimum threshold. If the trace_ttl value is above a minimum threshold, method 500 may proceed to step 550. At step 550, the feature trace query packet may be propagated to a next network device on the network path. If the trace_ttl value has reached the minimum threshold, method 500 may proceed to step 560. At step 560, the feature trace query packet may be dropped.

Figure 6:
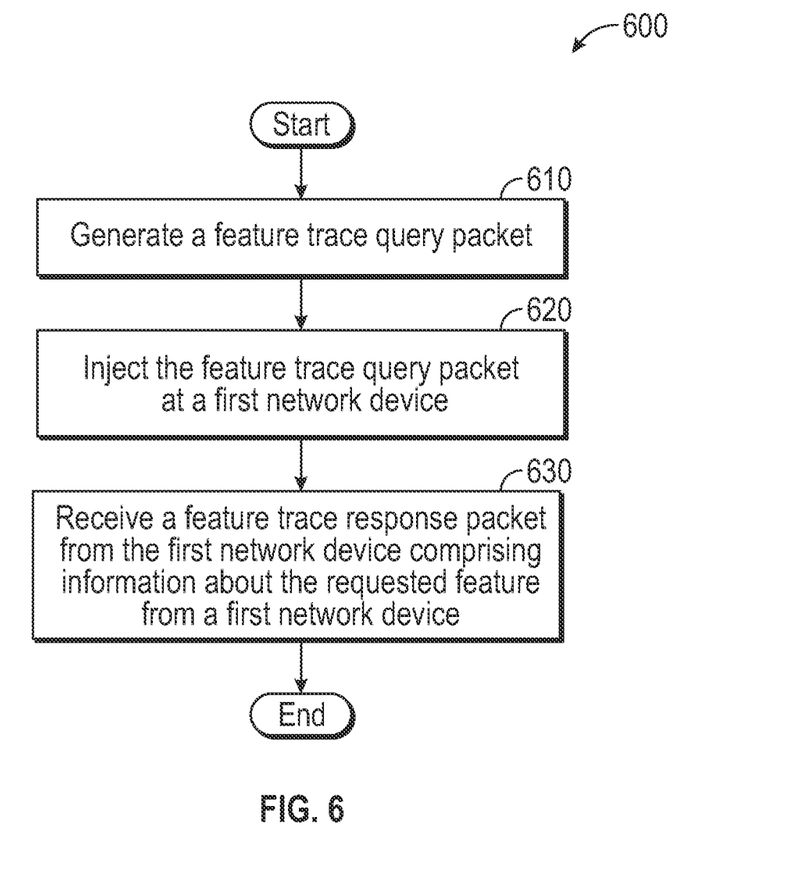
FIG. 6 is a flow chart illustrating embodiments of the present disclosure.

A method 600 implemented by one or more network devices employed on network environment 100 will now be described with reference to FIG. 6. Method 600 may begin at step 610 where a feature trace query packet may be generated. The feature trace query packet may request information about a first feature from a first network device.

Method 600 may next proceed to step 620. At step 620, the feature trace query packet may be injected at a first network device. In some embodiments, the feature trace query packet may be injected by a network management station. The feature trace query packet may comprise one or more destination address fields set to address information associated with the first network device.

Method 600 may then proceed to step 630. At step 630, a feature trace response packet may be received from the first network device comprising information about the first feature from a first network device. Once the feature trace response packet has been received and processed, software related to the first feature may be implemented based on the feature trace response packet information. For example, if it is learned that a network device supports auto QoS, then an auto-qos implementation may subsequently be deployed.

In some embodiments of the present disclosure, feature trace response packets may be received from each of a plurality of intermediate network devices locating between a network device responsible for generating the feature trace query packet and the first network device. This information may assist a network administrator by helping to map the network path from the requesting network device to the queried network device.

Embodiments of the disclosure, for example, may be implemented as a computer process (method), a computing system, or as an article of manufacture, such as a non-transitory computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure

What is claimed is:

1. A method comprising:
receiving a feature trace query packet comprising a trace total (trace_ttl) value at a first network device;
replying to the feature trace query packet with information about a feature specified in the feature trace packet, wherein replying to the feature trace query comprises creating a feature trace response packet comprising an internet protocol (IP) header field comprising a destination IP field comprising an IP address of a source network device initiating the feature trace query, a source IP field comprising an IP address of the first network device, a user datagram port (UDP) port field comprising address information of a destination UDP port in the source network device, a trace header field comprising a current trace_ttl value at a time of generation of the feature trace response packet, and a payload field comprising feature specific information requested in the feature trace query packet, and wherein the feature trace response packet is punted to the destination UDP port;
decrementing the trace_ttl value; and
dropping the feature trace query packet if the trace_ttl value has reached the minimum threshold.

2. The method of claim 1, wherein the feature trace packet is implemented using Internet Control Message Protocol (ICMP).

3. The method of claim 1, wherein the feature trace packet comprises one or more destination address fields set to "FF".

4. The method of claim 1, wherein the feature trace packet comprises a source IP address field set to a source IP address associated with an originator of the feature trace packet.

5. The method of claim 1, wherein the feature trace packet comprises a destination User Datagram Protocol (UDP) port field set to a value that ensures that the feature trace packet is punted to software for processing.

6. The method of claim 1, wherein the feature trace packet comprises a payload field set to an identifier of the feature specified in the feature trace packet.

7. The method of claim 6, wherein the identifier is provided in a type-length variable (TLV) format.

8. The method of claim 1, wherein the feature comprises one of automatic quality of service (auto QoS, power over Ethernet (PoE), and fabric compatibility.

9. The method of claim 1, wherein the feature trace packet comprises a source MAC address field set to a source MAC address associated with a most recent propagator of the feature trace packet.

10. The method of claim 1, wherein replying to the feature trace query packet comprises transmitting a feature trace response packet with a destination address field set to an IP address associated with an originator of the feature trace packet.

11. The method of claim 6, wherein a feature trace response packet provides information responsive to the identifier of the feature specified in the feature trace packet.

12. A method comprising:
generating a feature trace query packet requesting information about a first feature from a first network device;
injecting the feature trace query packet at the first network device, wherein the feature trace query packet comprises one or more destination address fields set to address information associated with the first network device; and
receiving a feature trace response packet from the first network device comprising information about the first feature from the first network device, wherein the feature trace response packet comprises an internet protocol (IP) header field comprising a destination IP field comprising an IP address of a source network device initiating the feature trace query, a source IP field comprising an IP address of the first network device, a user datagram port (UDP) port field comprising address information of a destination UDP port in the source network device, a trace header field comprising a current trace_ttl value at a time of generation of the feature trace response packet, and a payload field comprising feature specific information requested in the feature trace query packet, and wherein the feature trace response packet is punted to the destination UDP port.

13. The method of claim 12, further comprising: receiving feature trace response packets from each of a plurality of intermediate network devices locating between a network device responsible for generating the feature trace query packet and the first network device.

14. The method of claim 12, further comprising implementing software related to the first feature based on the feature trace response packet.

15. A system comprising:
a management station configured to generate and send a feature trace packet into a network wherein the feature trace packet comprises a total (trace_ttl) value; and
one or more feature trace members coupled to the network and configured to:
receive the feature trace packet;
reply to the feature trace query packet by creating a feature trace response packet comprising an internet protocol (IP) header field comprising a destination IP field comprising an IP address of a source network device initiating the feature trace query, a source IP field comprising an IP address of the first network device, a user datagram port (UDP) port field comprising address information of a destination UDP port in the source network device, a trace header field comprising a current trace_ttl value at a time of generation of the feature trace response packet, and a payload field comprising feature specific information requested in the feature trace query packet, and wherein the feature trace response packet is punted to the destination UDP port;
decrement the trace_ttl value; and
propagate the feature trace query packet while maintaining an original source address found in the feature trace query packet.

16. The system of claim 15, wherein one or more feature trace members are further configured to stop propagation of the feature trace query packet if the trace_ttl value equals 0.

17. The system of claim 15, wherein one or more feature trace members are Layer-2 switch devices configured to not decrement the trace_ttl value prior to propagating the feature trace query packet.

18. The system of claim 15, wherein the network management station is configured to inject a feature trace query packet into a network comprising the one or more feature trace members over a Hypertext Transfer Protocol Secure (HTTPS) connection.

19. The system of claim 15, further comprising one or more endpoint network devices connected to an edge of the network, the one or more endpoint network devices configured to drop the feature trace query packet.

20. The system of claim 19, wherein one of the one or more endpoint network devices is an IP-enabled telephone.

21. A method comprising:
receiving a feature trace query packet comprising a trace total (trace_ttl) value at a first network device;
replying to the feature trace query packet with information about a feature specified in the feature trace packet, wherein replying to the feature trace query comprises creating a feature trace response packet comprising an internet protocol (IP) header field comprising a destination IP field comprising an IP address of a source network device initiating the feature trace query, a source IP field comprising an IP address of the first network device, a user datagram port (UDP) port field comprising address information of a destination UDP port in the source network device, a trace header field comprising a current trace_ttl value at a time of generation of the feature trace response packet, and a payload field comprising feature specific information requested in the feature trace query packet, and wherein the feature trace response packet is punted to the destination UDP port;
decrementing the trace_ttl value; and
propagating the feature trace query packet to a second network device if the trace_ttl value is above a minimum threshold.

22. The method of claim 21, wherein the feature trace packet is implemented using Internet Control Message Protocol (ICMP).

23. The method of claim 21, wherein the feature trace packet comprises one or more destination address fields set to "FF".

24. The method of claim 21, wherein the feature trace packet comprises a source IP address field set to a source IP address associated with an originator of the feature trace packet.

25. The method of claim 21, wherein the feature trace packet comprises a destination User Datagram Protocol (UDP) port field set to a value that ensures that the feature trace packet is punted to software for processing.

26. The method of claim 21, wherein the feature trace packet comprises a payload field set to an identifier of the feature specified in the feature trace packet.

27. The method of claim 26, wherein the identifier is provided in a type-length variable (TLV) format.

28. The method of claim 21, wherein the feature comprises one of automatic quality of service (auto QoS, power over Ethernet (PoE), and fabric compatibility.

29. The method of claim 21, wherein the feature trace packet comprises a source MAC address field set to a source MAC address associated with a most recent propagator of the feature trace packet.

30. The method of claim 21, wherein replying to the feature trace query packet comprises transmitting a feature trace response packet with a destination address field set to an IP address associated with an originator of the feature trace packet.

* * * * *